Feb. 21, 1956 J. K. SHANNON ET AL 2,735,148
PROCESS FOR CASTING STORAGE BATTERY STRAPS AND TERMINALS
Filed Feb. 27, 1953 2 Sheets-Sheet 1

INVENTORS
JOHN K. SHANNON
ROBERT R. SCHMIT
BY
*Young & Wright*
ATTORNEYS

Feb. 21, 1956     J. K. SHANNON ET AL     2,735,148
PROCESS FOR CASTING STORAGE BATTERY STRAPS AND TERMINALS
Filed Feb. 27, 1953                     2 Sheets-Sheet 2
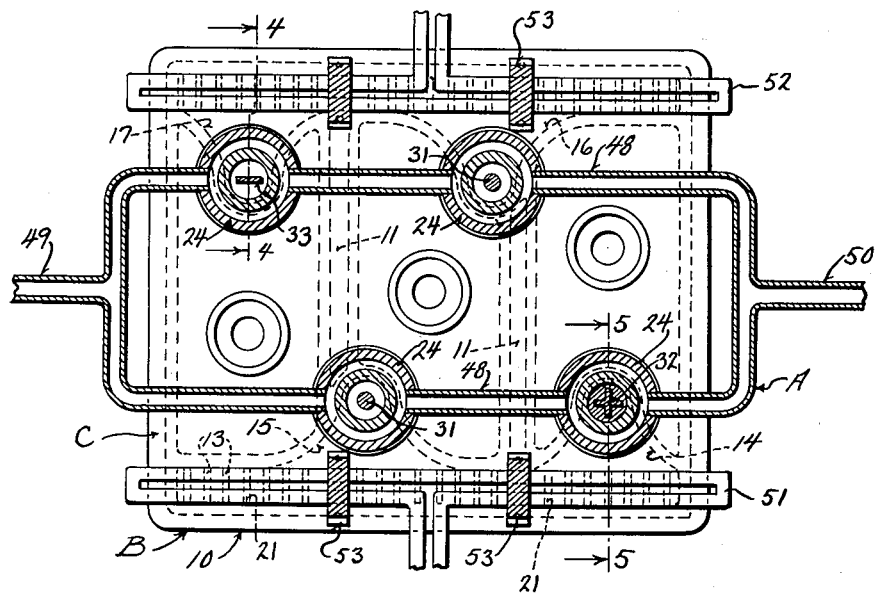
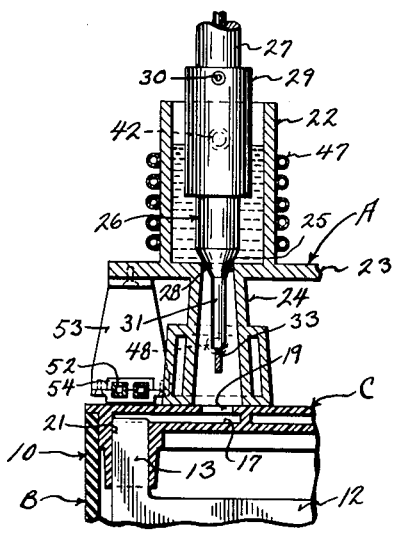
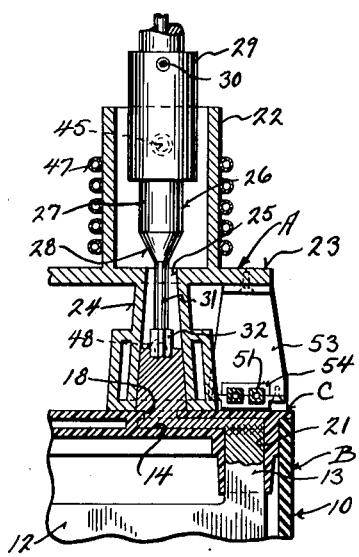
INVENTORS
JOHN K. SHANNON
ROBERT R. SCHMIT
BY
Moring & Wright
ATTORNEYS

United States Patent Office 2,735,148
Patented Feb. 21, 1956

2,735,148

PROCESS FOR CASTING STORAGE BATTERY STRAPS AND TERMINALS

John K. Shannon and Robert R. Schmit, Kenosha, Wis.

Application February 27, 1953, Serial No. 339,232

2 Claims. (Cl. 22—202)

This invention appertains to storage batteries, and more particularly to a novel method for casting straps on the lugs of battery plates, and the simultaneous forming and casting of the terminals of the battery.

One of the primary objects of this invention is to provide a method whereby assemblages of storage battery plates, while disposed in their normal upright, vertical positions, can have their conductor lugs effectively united by forming connecting straps thereon.

In our Patent No. 2,618,673, issued November 18, 1952, we disclosed a storage battery cover formed from dielectric material having interior mold cavities and ways communicating with the bottoms of the cavities for receiving the conductor lugs of battery plate assemblages, so that molten metal could be poured into the cavities through openings in the upper face of the cover for uniting the lugs, the walls of certain of the pouring openings constituting molds for the bases or roots of the battery terminal posts.

Certain problems were encountered in the uniting of the plate lugs by the pouring of molten metal thereon. In actual practice, there is usually some lead oxide deposit on the plate lugs which acts as an insulator and helps to prevent mixing of the incoming molten metal and the lugs. The molten metal flows in and around the plate lugs and transmits its heat to the lugs, but by the time the metal of the lugs becomes hot enough to mix with the incoming lead there is no mixing action and the least trace of lead oxide between the metals prevents a good bond.

It is therefore, another prime object of our invention to provide a method for pre-heating the tips of the plate lugs disposed in the cavities without affecting the dielectric material of the cover, so that the tips of the lugs will melt and join with the incoming molten metal poured in the cavities, whereby to effectively bring about an autogenous weld between the plate lugs and the straps being formed; the motion of the incoming molten lead functioning to effectively disturb the molten tips and any oxide deposit, to insure the weld.

A further important object of the invention is the provision of a method for releasing an exact predetermined quantity of molten metal into the cavities of the cover at the desired time and with induction coils disposed in an exact relation to the cavities and the tips of the plate lugs disposed therein.

Another further important object of the invention is the provision of a method for cooling the posts and straps after the pouring of the metal to permit the quick release of the apparatus from the battery cover.

With these and other objects in view, the invention consists in the novel construction, arrangement and formation of parts, as will be hereinafter more specifically described and claimed, and illustrated in the accompanying drawings, in which drawings, Figure 1 is a vertical sectional view through the apparatus and the upper end of a storage battery being assembled, the section being taken on the line 1—1 of Figure 2, looking in the direction of the arrows; for the purpose of illustration, the valve on the right hand side being shown open and the valve on the left hand side being shown closed.

Figure 3 is a horizontal sectional view taken on the line 3—3 of Figure 1 looking in the direction of the arrows and illustrating in particular, the position of the induction heating coils relative to the battery and the means employed for cooling the metal.

Figure 4 is a fragmentary detail vertical sectional view taken on the line 4—4 of Figure 3, looking in the direction of the arrows showing the valve for the negative terminal in its closed position prior to the introduction of molten metal into the cover.

Figure 5 is a similar view taken on the line 5—5 of Figure 3 looking in the direction of the arrows, but showing the valve for the positive terminal in its open position and the molten metal in the cavities for uniting the battery plate lugs and for forming the positive terminal post.

Figure 6 is a vertical sectional view through the upper end of the battery cover with the apparatus removed and the connector straps and shoulders formed on the battery plate lugs.

Figure 1:
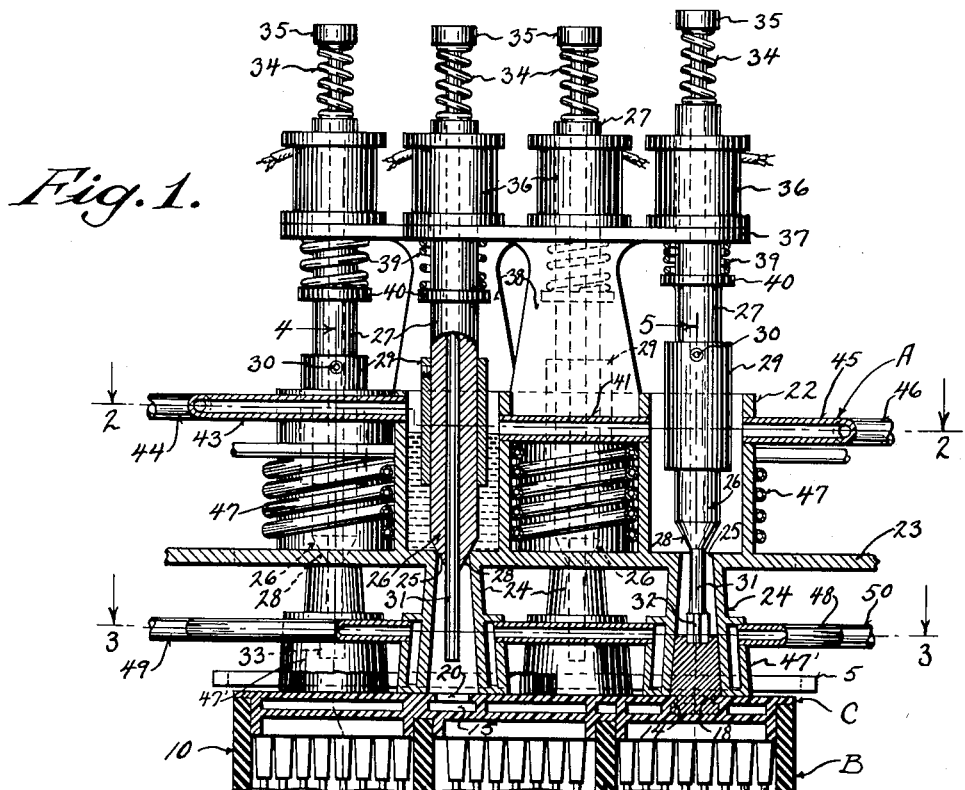
Figure 2:
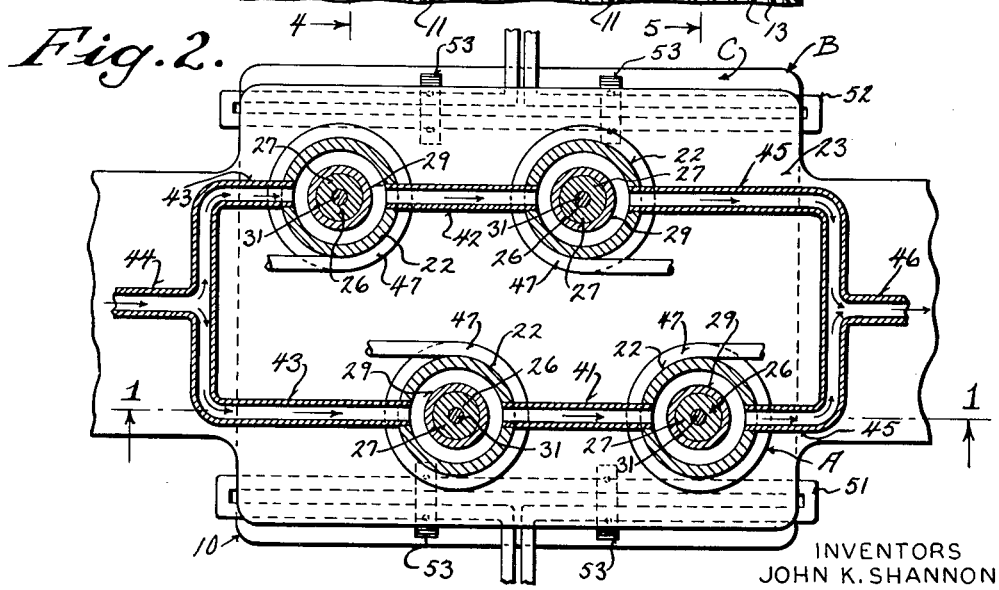
Figure 2 is a horizontal sectional view through the apparatus taken on the line 2—2 of Figure 1 looking in the direction of the arrows and illustrating the arrangement of the coupling means for the measuring chambers to direct the flow of molten metal therein.

Referring to the drawings in detail, wherein similar reference characters designate corresponding parts throughout the several views, the letter C generally indicates a cover for a storage battery B and A an apparatus for introducing molten metal into the battery cover and for forming connector straps and shoulders on the lugs of battery plate assemblages and terminal posts on the battery.

The battery B can be of any preferred character and type and of any desired number of cells, and includes a case 10 divided into cells by transverse partitions 11. The cells receive the usual groups of battery plates 12 and the plates are provided with upstanding conductor lugs 13. The case 10 and its cells are closed by the cover C, which is of a special design, as illustrated, described and claimed in our mentioned Patent No. 2,618,673. The cover C will not be described in detail, but the same is formed from dielectric material and is provided with interior cavities 14 and 15 on one side and cavities 16 and 17 on the opposite side. Diagonally opposed cavities 14 and 17 are similar and have communicating therewith respectively, openings 18 and 19, the walls of which constitute molds for the roots of positive and negative battery terminal posts, as will later appear. The cavities 15 and 16 are similar and extend over adjacent cells of the battery for the connector jump straps and these cavities have communicating therewith pouring openings 20. All of the cavities have communicating with their lower ends, ways 21 which receive the lugs 13 of the groups of battery plates 12 and by referring to Figure 4, it can be seen that the tips of the battery plate lugs extend into the cavities.

Our apparatus A employed for introducing an exact amount of molten metal into the cavities 14, 15, 16 and 17 and for pre-heating the tips of the plate lugs 13, includes a series of measuring chambers 22 arranged in staggered relation, relative to one another. The number of measuring chambers 22 depends on the number of cells in the battery being assembled and in the present illustration, four measuring chambers have been shown and there is a measuring chamber for the terminal post and pouring openings 18 and 19, and the pouring openings 20 and the chambers are exactly positioned to correspond to the position of the openings just mentioned when the apparatus is placed over a battery cover. All of the measuring chambers 22 are rigidly united in any preferred manner, such as by a horizontally disposed plate 23, and means (not shown) can be associated with the plate for raising and lowering the entire apparatus. Depending from the plate 23, below the measuring chambers 22, are filling funnels or spouts 24, the upper ends of which communicate with the axial centers of the measuring chambers. The lower end of each chamber is provided with a valve seat 25 controlled by a reciprocatory valve 26. When a valve 26 is in a lowered position, as shown in Figure 4, and at the left of Figure 1, the flow of molten metal from a measuring chamber into a funnel 24 is prevented, and when a valve 26 is in its raised open position, as shown in Figure 5, and at the right of Figure 1, molten metal can flow from a measuring chamber into its funnel 24. The lower faces of all of the funnels or spouts 24 are flat so as to snugly rest against the upper surface of the battery cover C around a pouring opening, so that metal flowing from a measuring chamber will flow directly into a cavity in the battery cover.

Particular attention is now directed to the valves 26, and it is to be noted that each valve includes a cylindrical body 27 tapered at its lower end, as at 28, to close a valve seat 25, when the body is in its lowered position. Each valve body has slidably mounted thereon a sleeve 29 which can be raised and lowered on the valve body and held in a preferred adjusted position by any suitable means, such as a set screw 30. By moving a sleeve 29 up and down on its valve body, into and out of a measuring chamber, the volume of the measuring chamber can be increased or decreased, whereby to govern the amount of molten metal in each chamber. Slidably mounted through the center of each valve body 27 is a tap rod 31, the purpose of which, will later appear. It is to be noted, however, that the lower ends of the tap rods 31 for the battery terminal posts have formed thereon plus and minus dies indicated by the reference characters 32 and 33. The tap rods extend entirely through the valve bodies 27 and project above the valve bodies and are held in a predetermined raised position by expansion springs 34, coiled about the tap rods and confined between the upper ends of the valve bodies 27 and anvil heads 35 carried by the upper ends of the tap rods.

The valve bodies can be raised and lowered to their open and closed positions by any approved mechanism, such as by air cylinders or, as illustrated, by solenoids 36. Where solenoids are employed, the valve bodies 27 extend axially through the solenoids and the valve bodies constitute the plungers for the solenoids. The solenoids 36 can all be supported by an upper plate 37, and this plate in turn can be supported by depending webs 38 united with certain of the measuring chambers or cups 22. In the illustration, the valve bodies are normally held in their lowered closed position by expansion springs 39 coiled about the valve bodies and confined between the plate 37 and collars 40 rigidly secured to the valve bodies. Upon energizing of the coils of the solenoids 36, the valve bodies will be raised to their open positions against tension of the springs 39. The electric circuit for the solenoids has not been illustrated, as the same can be of a conventional character, and any preferred type of switch or switches can be employed for closing a circuit through the solenoids or solenoid.

The measuring chambers or cups 22 are connected on one side by a tube 41 and the measuring chambers or cups 22 on the other side of the plate are connected by a similar pipe or tube 42. Communicating with the two foremost measuring chambers or cups 22 are branch pipes 43 which lead from a common distributing pipe 44, which in turn communicates with a heated pot for molten metal (not shown) and the flow of metal from the pot to the pipe 44 can be controlled by a suitable gate (not shown). The rearmost pair of measuring chambers or cups 22 have communicating therewith branch over-flow pipes 45 which in turn communicate with a common over-flow pipe 46, which can empty into any catch basin or the like (not shown).

By referring to Figure 1, it can be seen that the pipes 41 and 42 are at a certain level, so that after the filling of the two foremost chambers or cups 22 molten metal will then flow into the two rearmost measuring chambers or cups 22. The over-flow branch pipes 45 are also at a certain level so that the two rearmost cups or chambers will only fill to a certain desired height.

The molten metal in all of the cups or measuring chambers 22 is maintained in its free flowing molten condition by electric heating coils 47, and these coils surround the individual measuring chambers or cups. After the pouring of the molten metal into the cavities of the battery case, as will be later more specifically described, the solidifying of the metal is hastened by cooling the funnels or discharge spouts 24 adjacent to the battery cover. This can be brought about by providing a jacket 47' for each funnel or spout 24 adjacent to its lower end and the jackets are supplied with a coolant by means of pipes 48 which connect the chambers. A feed pipe 49 and an over-flow pipe 50 are provided for the distributing pipes 48, as is best shown in Figure 3.

The salient feature of our invention resides in means for heating the tips of the plate lugs 13 disposed in the cavities before and during the entrance of molten metal into the cavities to reduce these tips to a molten condition. To bring this about, we provide water cooled induction heating coils 51 and 52 on each side of the battery cover and these induction coils 51 and 52 are exactly placed so as to lie directly above and in close proximity to the tips of the plate lugs 13 in the cavities. The induction coils 51 and 52 while in close proximity to the battery cover are slightly spaced therefrom. The coils 51 and 52 are adapted to carry high frequency alternating current for inductively heating the tips of the lugs 13 without affecting the dielectric material from which the cover C is made. Standard apparatus for developing and applying suitable high frequency current for inductive heating is available on the market and it is not deemed necessary to illustrate or describe it here.

In order to maintain the induction heating coils 51 and 52 in their exact predetermined relation, it is preferred to carry the coils from the plate 23, and this can be done by providing depending brackets 53, secured to the plate 23. Clamps 54 of dielectric material can join the coils with the brackets (see Figures 4 and 5). By referring to Figure 3, it can be seen that the induction heating coils 51 and 52 extend the length of the battery cover, so as to insure the effective heating of all of the tips of the lugs of the battery plate assemblages.

By referring to Figures 4 and 5, it can be seen that the lower ends of the funnels or pouring spouts 24 which lie above the openings 18 and 19 in the battery case form molds for the positive and negative terminal posts of the battery, as will now appear.

In operation, all of the valves 26 are closed and the desired amount of molten lead flows into the measuring chambers or cups 22 as determined by the adjustable displacement sleeves 29. The metal remains in a molten state through the medium of the heating coils 47, while the induction heating coils 51 and 52 are inducing heat into the extreme upper tips of battery plate lugs 13. The lugs 13 are heated to the desired point and the valves 26 will now open by the closing of the circuit through the solenoids 36 and the molten lead is allowed to enter the cavities 14, 15, 16 and 17 through the openings 18, 19 and 20. The motion of the molten lead traveling over the heated lugs 13 causes mixing of the incoming molten lead with the molten lead of the lugs 13, thus forming shoulders and connecting straps of a shape corresponding to the mold cavities. The molten metal flowing into the cavities, joining with the molten metal of the lugs, forms an autogenous weld. Upon the solidifying of the metal, which action is advanced by the cooling of the funnels or discharge spouts 24, the battery cover C can be knocked off the apparatus A by tapping the anvil heads 35 on the tap rods 31. It is to be understood that during the flowing of the metal, the metal in the diagonally opposite discharge spouts or funnels 24 rises therein to form the positive and negative terminal posts and that the dies 32 and 33 mold the plus and minus signs in the upper faces of these posts.

Any lead protruding above the openings 20 is smoothed off in any desired manner and can be covered by dielectric material should such be desired.

The operation of forming the straps in the covers is performed in cycles, as can be readily understood and the batteries and their covers are placed one-by-one in a continuous process under the apparatus A.

Changes in details may be made without departing from the spirit or the scope of the invention, but what we claim as new is:

1. In a process for casting shoulders and straps on the lugs of assembled storage battery plates and forming battery terminal posts which consists in placing the assembled plates in a case, closing the case by a cover having interior mold cavities with the tips of the lugs in the cavities, pre-heating the tips of the lugs in the cavities by electric induction coils disposed in close proximity to the cover directly above the tips of the lugs and introducing free flowing molten metal into the cavities around the pre-heated tips of the lugs.

2. In a process for casting shoulders and straps on lugs of assembled battery plates disposed in an upright normal position which consists in introducing the tips of the lugs into cavities formed in a battery cover formed of dielectric material; reducing the tips of the lugs to a molten state by electric induction coils disposed in close proximity to the cover above said tips, introducing a predetermined quantity of free flowing metal into each cavity, and then cooling the metal in the cavities.

References Cited in the file of this patent
UNITED STATES PATENTS

| | | |
|---|---|---|
| 1,776,327 | Sentkowski | Sept. 23, 1930 |
| 1,811,292 | Barhoff | June 23, 1931 |
| 2,004,340 | Patterson | June 11, 1935 |
| 2,305,150 | Fearon | Dec. 15, 1942 |
| 2,387,590 | Koenig et al. | Oct. 23, 1945 |
| 2,454,053 | Galloway | Nov. 16, 1948 |
| 2,502,373 | Galloway | Mar. 28, 1950 |
| 2,542,503 | Galloway | Feb. 20, 1951 |